US006978743B1

(12) United States Patent
Pölzl et al.

(10) Patent No.: US 6,978,743 B1
(45) Date of Patent: Dec. 27, 2005

(54) INTAKE DEVICE FOR A W-12 RECIPROCATING PISTON INTERNAL COMBUSTION ENGINE

(75) Inventors: Hans-Werner Pölzl, Bad Wimpfen (DE); Xaver Stemmer, Reichertshofen (DE); Clemens Bandel, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 08/323,385

(22) Filed: Oct. 14, 1994

(30) Foreign Application Priority Data

Oct. 16, 1993 (DE) .......................................... 43 35 358

(51) Int. Cl.⁷ ........................ F02M 35/10; F02B 27/00; F02B 75/22
(52) U.S. Cl. .................................................. 123/55.1
(58) Field of Search ..................... 123/55.1, 54.1, 123/52.1, 195 R, 193.5, 193.3, 184.21

(56) References Cited

U.S. PATENT DOCUMENTS

| | | | | |
|---|---|---|---|---|
| 1,235,111 A | * | 7/1917 | Coatalen | 123/55.1 |
| 1,309,919 A | * | 7/1919 | Tone | 123/55.1 |
| 1,622,172 A | * | 3/1927 | Angle | 123/55.1 |
| 1,740,843 A | * | 12/1929 | Stickney | 123/54.1 |
| 2,722,923 A | * | 11/1955 | Morissette | 123/55.1 |
| 2,915,050 A | * | 12/1959 | Allred | 123/55.1 |
| 5,056,472 A | | 10/1991 | Kurokawa et al. | |

FOREIGN PATENT DOCUMENTS

| | | | | |
|---|---|---|---|---|
| IT | 0298781 | * | 8/1932 | 123/55.1 |
| JP | 2271028 | | 11/1990 | |
| JP | 396634 | | 4/1991 | |
| JP | 3124953 | | 5/1991 | |
| JP | 3168326 | | 7/1991 | |
| SU | 1460374 | | 2/1989 | |
| SU | 1612100 | | 12/1990 | |

OTHER PUBLICATIONS

Patent Abstracts of Japan, Publication No. JP3138421.
Patent Abstracts of Japan, Publication No. JP3124915.

* cited by examiner

Primary Examiner—Marguerite Macy
(74) Attorney, Agent, or Firm—Stevens, Davis, Miller & Mosher, LLP

(57) ABSTRACT

In an intake device for a W-12 reciprocating piston internal combustion engine with three rows of cylinders of four cylinders each, a structurally favorable and functionally advantageous arrangement is achieved with two intake distributors, each of which is connected to only two cylinders of each row of cylinders via lines which are separate for each row of cylinders.

10 Claims, 2 Drawing Sheets

INTAKE DEVICE FOR A W-12 RECIPROCATING PISTON INTERNAL COMBUSTION ENGINE

Figure 1:
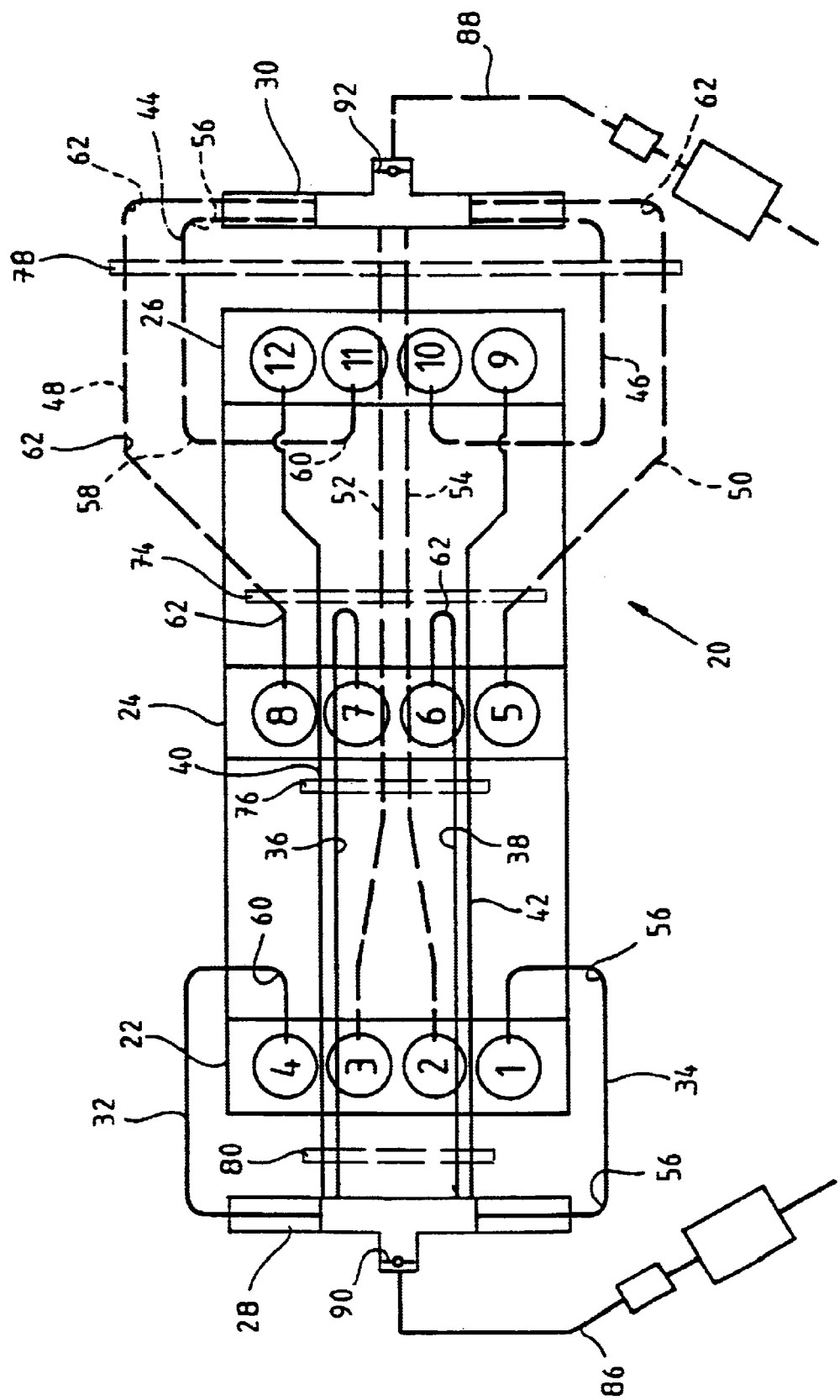

The invention relates to an intake device for a W-12 reciprocating piston internal combustion engine with three rows of cylinders of four cylinders each, according to the preamble of patent claim 1.

Internal combustion engines of the generic type are characterized by a compact construction with high power density, however require extremely high construction and control engineering cost, among others in the intake and exhaust side supply, in order to achieve up-to-date emission and fuel consumption values.

The problem of the invention is to propose, proceeding from the generic internal combustion engine, an intake device which has favorable operating behavior at reasonable construction and control engineering cost.

This problem is solved according to the invention with the characterizing features of patent claim 1. Advantageous developments of the invention can be taken from the other patent claims.

According to the invention it is proposed that the internal combustion engine be operated in terms of control engineering like two six-cylinder internal combustion engines by means of two intake distributors, the intake distributors each being connected to two cylinders of each row of cylinders of the internal combustion engine. This results in a reduced control engineering and construction cost in the intake-side supply of the internal combustion engine by, among others, the possibility of designing the fuel metering and also the lambda control necessary for exhaust neutralization according to two six-cylinder internal combustion engines. Moreover, this configuration offers the advantage of shutting down six cylinders of the internal combustion engine for example in city driving and firing only six cylinders with uniform, thorough warming of the internal combustion engine.

The two intake distributors can be located parallel to the two outside rows of cylinders and adjacent to them in a structurally especially advantageous manner. Since the two outside rows of cylinders in a vertical arrangement of the middle row of cylinders of the internal combustion engine are lower, preferably the two intake distributors can be located above these rows of cylinders so that especially in a configuration of the internal combustion engine in a motor vehicle a flat construction arises.

By means of the features of patent claims 3–7 favorable line routings arise especially when using individual lines from the intake distributors to the inlet channels in the cylinder heads of the corresponding rows of cylinders, in which the individual-lines can be made essentially of identical length. Of course, the individual lines can be combined into line sections with respect to their structural design.

For favorabley accomodating the intake device in terms of flow dynamics, in addition according to claim 8 it is proposed that the indicated cylinders in the stipulated ignition sequence be combined as specified with respect to the intake system and thus adversely influencing gas pulsations in the intake system be precluded.

The features of patent claim 10 finally describe one advantageous structural configuration of the intake device which in spite of complicated line routing enables a construction which is simple to produce and easy to install.

One embodiment of the invention is detailed below with additional details. The following drawing shows in FIG. 1 a block diagram of an intake device for a W-12 reciprocating piston internal combustion engine with two intake distributors; and FIG. 2 a cross section through a partially shown W-12 reciprocating piston internal combustion engine with an intake device according to FIG. 1 which is located above the rows of cylinders.

Figure 2:
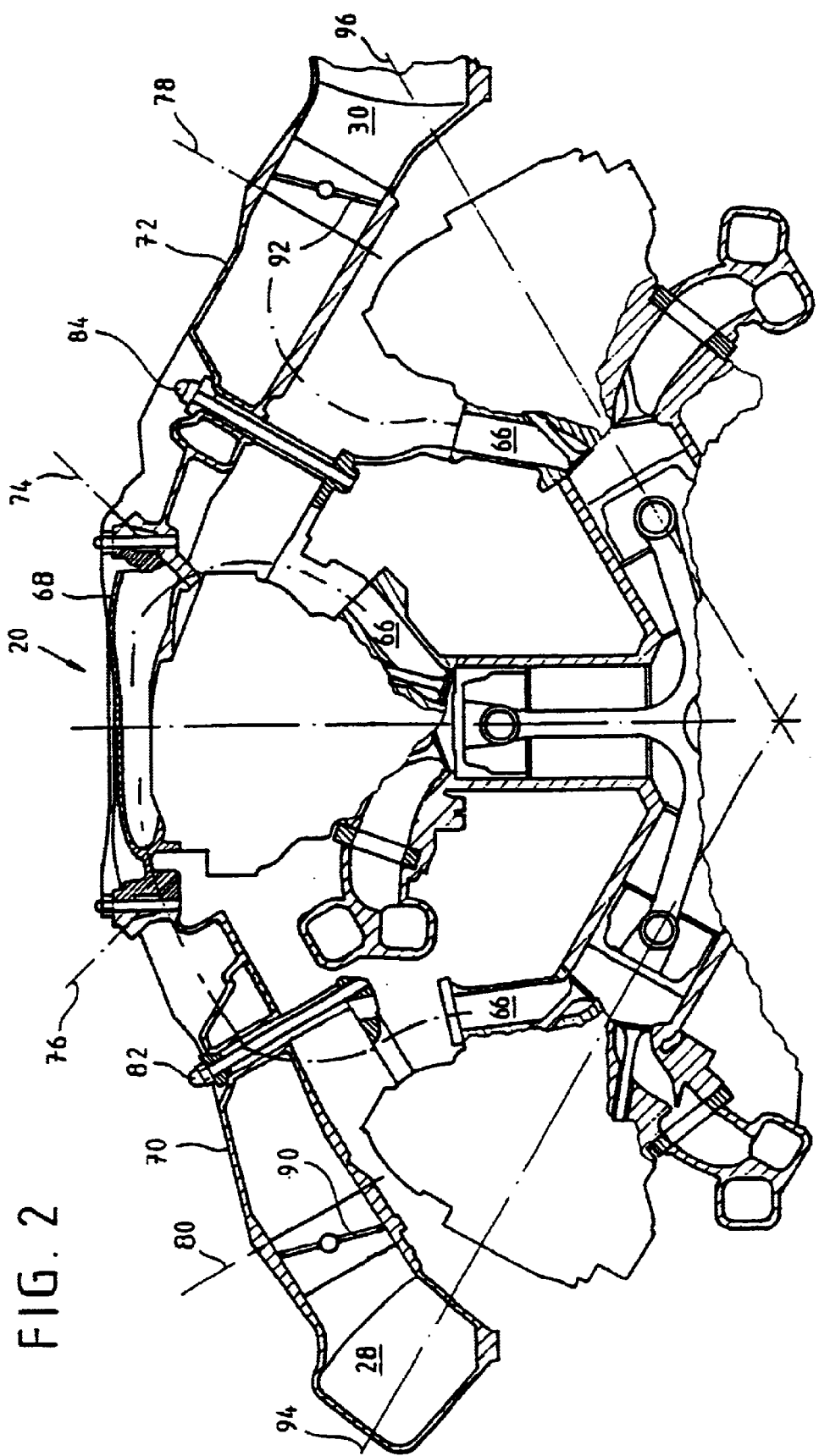

FIGS. 1 and 2 show a four-cycle W-12 reciprocating piston internal combustion engine labelled 20 with three rows of cylinders 22, 24, 26 which are parallel to one another with four cylinder each (numbered 1–12). The rows of cylinders are arranged in a W shape, as can be easily taken from FIG. 2, in which the middle row of cylinders with cylinders 5–8 is aligned vertically. The cylinder offset is 60° to one another, the ignition sequence is 1-8-9-3-6-11-4-5-12-2-7-10.

The intake device of the internal combustion engine is composed of two intake distributors (28, 30) which are arranged parallel to the outside rows of cylinders 22, 26 and which are connected via individual lines still to be described to the respective inlet channels in the cylinder heads of the internal combustion engine.

Thus the intake distributor 28 on the left in the drawing is flow-connected via two individual lines 32, 34 to cylinders 1 and 4 of the left outside row of cylinders. Two more lines 36, 38 connect cylinders 6 and 7 of the second row of cylinders 24 and two lines 40, 42 connect cylinders 9 and 12 of the third row of cylinders 26 to intake distributor 28. As is apparent based on the schematically shown line routing, the inlet sides or inlet channels in the cylinder head of the internal combustion engine of the two outside rows of cylinders 22, 26 are arranged facing the intake distributor (28, 30) which is opposite at the time or the middle row of cylinders 24.

The right-side intake distributor 30 is connected via two individual lines 44, 46' to cylinders 10, 11 of the right row of cylinders 26; furthermore the individual lines 48, 50 and individual lines 52, 54 are connected to cylinders 5 and 8 of the middle row of cylinders 24 or cylinders 2 and 3 of the left row of cylinders 22.

To achieve essentially identical line lengths individual lines 32, 34 or 44, 46 are each provided with three flow turns 56, 58, 60, while the medium length lines 36, 38 or 48, 50 are placed with at least one flow turn 62 and the lines 40, 42 or 52, 54 which are longest based on the row of cylinders which is farthest away are placed in a straight line essentially without flow turning. For purposes of the current invention turns are defined as the corresponding intentionally arranged pipe bends, on the basis of which the imaginary pipe center axis can be according lengthened.

To achieve the desired turns the short lines 32, 34 and 44, 46 emerge from the front of the pipe-shaped intake distributors 28, 30, are routed past laterally on the cylinder heads of rows of cylinders 22, 26, and finally discharge into the corresponding inlet channels of the internal combustion engine (compare FIG. 2 inlet channels 66).

As FIG. 2 in particular shows, lines 36, 38, 40, 42, 44, 46, 48, 50, 52, 54 to be designated fluidically as individual lines are combined into line sections 68, 70, 72 which contain individual lines as channels, which extend over the middle row of cylinders 24 adapted to the latter with a flat cross section and which are connected via attachment flanges 74, 76, 78, 80 to one another and to intake distributors 28, 30 by the corresponding attachment screws. Intake distributors 28, 30 thus lie over the cylinder heads of the outside rows of cylinders 22, 26 essentially in their cylinder center planes 94, 96. The entire structural unit is screwed after its premounting via attachment screws 82, 84 to the mechanically strong walls of the internal combustion engine.

The intake distributors are connected in the known manner to lines 86, 88 in which fuel metering of the internal combustion engine and air filtering are located. The flow rate of combustion air can be controlled in the known manner via throttle valves 90, 92.

What is claimed is:

1. Intake device for a W-12 reciprocating piston internal combustion engine with three rows of cylinders having four cylinders each, comprising first and second intake distributors, first intake lines for connecting said first intake distributor to only first and second cylinders of each of said three rows of said cylinders, and second intake lines, separate from said first intake lines, for connecting said second intake distributor to only third and fourth cylinders of each of said three rows of cylinders.

2. Intake device as in claim 1 wherein the intake distributors (28, 30) are arranged parallel and adjacent to two outside rows of said rows of cylinders (22, 26).

3. Intake device as in claims 1 or 2, wherein the intake distributors (28, 30) are arranged essentially above said outside rows of cylinders (22, 26) in their respective cylinder center planes.

4. Intake device as in claim 3, wherein inlet channel sides of the cylinder heads of said two outside rows of cylinders (22, 26) are facing one another and lying internally and wherein two cylinders (2, 3 or 9, 12) are connected to the intake distributor (28, 30) which is furthest away.

5. Intake device as in claim 4, wherein two cylinders (2, 3 or 9, 12) of each outside cylinder row (22, 26) are connected by essentially straight lines (40, 42 or 52, 54) which run flat over a middle row of cylinders (24) to the intake distributor (28, 30) which is furthest away.

6. Intake device as in claim 5, wherein inlet channels of the middle row of cylinders (24) lie on one side and wherein the lines (36, 38 or 48, 50) connected to the two intake distributors (28, 30) have at least two turns (62) to the nearer intake distributors (28, 30) and only one turn (62) to the more distant intake distributor (28, 30).

7. Intake device as in claim 6, wherein the cylinders of the outside rows of cylinders (22, 26) nearest the respective intake distributor (28, 30) are connected laterally with lines (32, 34, or 44, 46) which are routed on the front of the cylinder heads around the cylinder heads to the intake distributor (28, 30), the intake distributors (28, 30) being provided with air feeds (86, 88) which discharge in the middle of the intake distributors.

8. Intake device as in claim 7, wherein all lines emerging from the intake distributors (28, 30) are made fluidically separate.

9. Intake device as in claim 8, wherein in an ignition sequence of 1-8-9-3-6-11-4-5-12-2-7-10 cylinders 1, 4, 6, 7, 9 and 12 are connected to one intake distributor (28) and the other cylinders are connected to the other intake distributor (30).

10. Intake device as in claim 9, wherein the intake distributors (28, 30) with individual lines are combined into one structural unit which has at least one middle line section (68) which lies above the middle row of cylinders (24) and two outside line sections (70, 72) which are connected to the intake distributors (28, 30).

* * * * *